US011441877B1

(12) United States Patent
Colosimo

(10) Patent No.: US 11,441,877 B1
(45) Date of Patent: Sep. 13, 2022

(54) LINE APPARATUS FOR INHIBITING AN AIRBORNE TARGET

(71) Applicant: BAE Systems plc, London (GB)

(72) Inventor: Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/626,305

(22) PCT Filed: Jun. 18, 2020

(86) PCT No.: PCT/GB2020/051471
§ 371 (c)(1),
(2) Date: Jan. 11, 2022

(87) PCT Pub. No.: WO2021/009475
PCT Pub. Date: Jan. 21, 2021

(30) Foreign Application Priority Data

Jul. 18, 2019 (GB) ..................................... 1910279
Sep. 3, 2019 (EP) ..................................... 19195214

(51) Int. Cl.
*B64C 39/02* (2006.01)
*F41H 11/04* (2006.01)

(52) U.S. Cl.
CPC ............ *F41H 11/04* (2013.01); *B64C 39/024* (2013.01); *B64C 2201/02* (2013.01); *B64C 2201/141* (2013.01); *B64C 2201/146* (2013.01)

(58) Field of Classification Search
CPC ... F41H 11/04; B64C 39/024; B64C 2201/02; B64C 2201/141; B64C 2201/146; B64F 1/00; B64F 1/027; B64D 7/00
See application file for complete search history.

(56) References Cited

U.S. PATENT DOCUMENTS

| 10,155,587 | B1* | 12/2018 | Tang | B64D 47/02 |
| 11,192,646 | B2* | 12/2021 | Smith | B64D 47/08 |
| 11,255,643 | B2* | 2/2022 | Ang | F42B 12/58 |
| 2014/0203140 | A1 | 7/2014 | McGeer | |
| 2015/0360797 | A1* | 12/2015 | Melish | B64F 1/025 244/110 C |
| 2017/0261292 | A1 | 9/2017 | Armstrong | |
| 2017/0355461 | A1* | 12/2017 | Naito | B64C 13/18 |

(Continued)

FOREIGN PATENT DOCUMENTS

| EP | 3514060 A1 | 7/2019 |
| GB | 2525900 A2 | 11/2015 |

(Continued)

OTHER PUBLICATIONS

International Preliminary Report on Patentability of PCT Application No. PCT/GB2020/051471, dated Jan. 27, 2022, 7 pages.

(Continued)

*Primary Examiner* — Justin M Benedik
(74) *Attorney, Agent, or Firm* — Maine Cernota & Rardin

(57) ABSTRACT

There is disclosed a line apparatus for inhibiting an airborne target. The line apparatus comprises at least one line comprising: a flexible tubular member, having a wall and defining a bore; and a fluid adhesive housed within the flexible tubular member, wherein the flexible tubular member is configured to express the fluid adhesive through the wall.

15 Claims, 3 Drawing Sheets

(56) References Cited

U.S. PATENT DOCUMENTS

| | | | |
|---|---|---|---|
| 2018/0162530 A1* | 6/2018 | Klein | B64D 1/02 |
| 2018/0327093 A1 | 11/2018 | von Flotow | |
| 2019/0100315 A1* | 4/2019 | Theiss | B64D 7/00 |
| 2019/0129427 A1* | 5/2019 | Sugaki | G05D 1/12 |
| 2020/0108924 A1* | 4/2020 | Smith | F41H 13/0087 |
| 2020/0108925 A1* | 4/2020 | Smith | B64D 1/16 |

FOREIGN PATENT DOCUMENTS

| | | | |
|---|---|---|---|
| GB | 2538976 | A | 12/2016 |
| JP | 2017114255 | A | 6/2017 |
| RU | 2679377 | C1 | 2/2019 |
| WO | 2015191804 | A2 | 12/2015 |
| WO | 2018015576 | A1 | 1/2018 |

OTHER PUBLICATIONS

International Preliminary Report on Patentability of PCT Application No. PCT/GB2020/051470, dated Jan. 27, 2022, 9 pages.

PCT Search Report and Written Opinion of PCT Application No. PCT/GB2020/051471, dated Sep. 4, 2020, 11 pages.

PCT Search Report of PCT Application No. PCT/GB2020/051470, dated Sep. 8, 2020, 6 pages.

Extended European Search Report of EP Application No. EP19195214.2, dated Mar. 3, 2020, 8 pages.

Great Britain Search Report of GB Application No. GB1910279.7, dated Jan. 17, 2020, 3 pages.

Extended European Search Report of EP Application No. EP19195212.6, dated Mar. 11, 2020, 9 pages.

Great Britain Search Report of GB Application No. GB1910280.5, dated Jan. 17, 2020, 3 pages.

* cited by examiner

LINE APPARATUS FOR INHIBITING AN AIRBORNE TARGET

RELATED APPLICATIONS

This application is a national phase application filed under 35 USC § 371 of PCT Application No. PCT/GB2020/051471 with an international filing date of Jun. 18, 2020, which claims priority of GB Patent Application 1910279.7 filed Jul. 18, 2019 and European application 19195214.2 filed Sep. 3, 2019. All of these applications are incorporated herein by reference in their entirety for all purposes.

FIELD OF THE INVENTION

The following invention relates to a line apparatus for inhibiting an airborne target, and a method of using such.

BACKGROUND OF THE INVENTION

It is known to intercept an airborne target, for example a light unmanned rotorcraft, by firing a net towards the target. The target rotorcraft may then tend to become at least partially disabled either by interference of the net lines with the rotors, or by the attachment of the net and the associated extra mass affecting flight. However, the disabled target rotorcraft may still pose a threat due to the difficulty in controlling its landing.

SUMMARY OF THE INVENTION

According to a first aspect of the invention there is provided a line apparatus for inhibiting an airborne target comprising: at least one line comprising: a flexible tubular member, having a wall and defining a bore; and a fluid adhesive housed within the flexible tubular member, wherein the flexible tubular member is configured to express the fluid adhesive through the wall.

Thus there is provided a line which can tend to attach to the target by way of bonding, and thereby may attach to non-moving parts of the target, such as the housing or nacelle.

The flexible tubular member may comprise: a plurality of slits through the wall, which slits are configured to remain generally closed, but on deformation of the flexible tubular member can open to permit the expression of the adhesive.

The slits may follow a portion of the circumference of the tubular member.

The wall of the tubular member may be in the form of a porous matrix such that the fluid adhesive may be urged to the outer diameter of the tubular member.

The at least one line may be a plurality of lines.

The line apparatus may further comprise an aircraft, from which is suspended the at least one line.

The aircraft may comprise a frame, from which is suspended the at least one line.

The line apparatus may comprise at least one further type of line, being of a different type to the at least one line.

By providing different types of lines, more possibilities of attaching the aircraft to the target can be provided, increasing the chance of the aircraft connecting to the target. In particular, the attachment may come about from a line tangling with a rotor or propeller or other moving part of the target.

The at least one further type of line may be thinner than the at least one line.

The at least one further type of line may be a plurality of the further type of line.

For a line apparatus having a frame and two types of line, the frame may comprise: an inner member; and an outer member, wherein the at least one line is attached to the inner member, and the at least one further type of line is attached to the outer member.

Such frame features contribute to the overall provision of a consistently arranged set of lines, which can tend to provide reliability.

The aircraft may be a rotorcraft, and may have a mass of 25 kg or less, and may be remotely or autonomously piloted.

According to a second aspect of the invention, there is provided a method of intercepting a target comprising:— providing at least one line comprising: a flexible tubular member, having a wall and defining a bore; and a fluid adhesive housed within the flexible tubular member, wherein the flexible tubular member is configured to express the fluid adhesive through the wall, and—applying the at least one line to the target, such that the line may bond to the target.

Thus the target may be not only inhibited but also brought under the control of whatever the flexible tubular member is mounted to. Where the flexible tubular member is mounted on an aircraft, that aircraft can transport the target away to a safer area.

BRIEF DESCRIPTION OF THE DRAWINGS

So that the invention may be well understood, embodiments thereof will now be discussed with reference to the following figures, of which.

DETAILED DESCRIPTION

Figure 1:
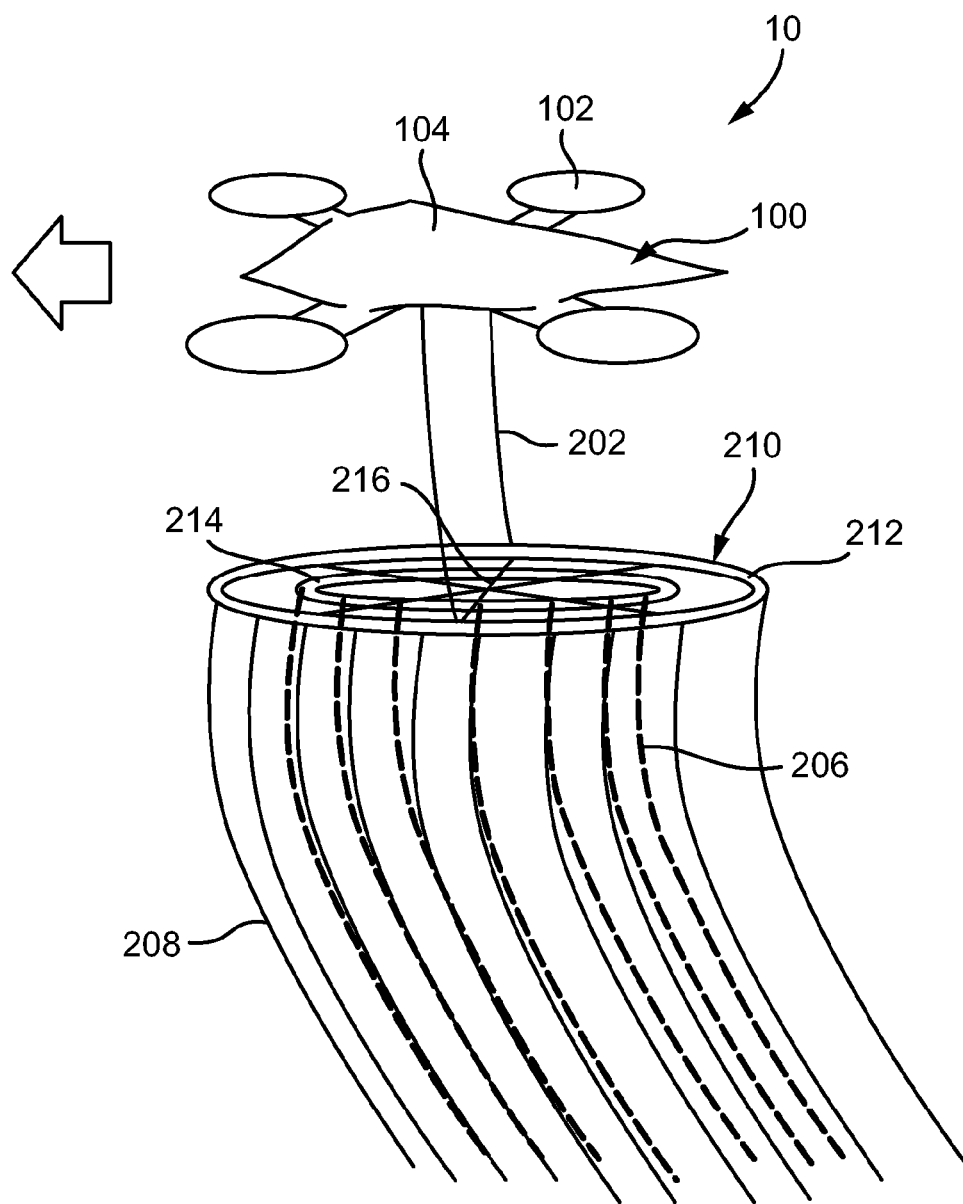
FIG. 1 shows a three-dimensional representation of an aircraft according to the invention.

Referring to FIG. 1 there is shown generally at 10 an aircraft device. The aircraft device 10 comprises an aircraft 100 which carries a payload 200.

The aircraft 100 is in the form of a light weight rotorcraft (e.g. under 25 kg) having a generally planar form and having four rotors 102 supported off a central housing 104, the rotors 102 being evenly distributed at the horizontal periphery of the aircraft 100.

The payload 200 comprises a trapeze mount 202, a frame 210, first lines 206 and second lines 208.

The mount 202 is attached at one end to the central housing 104 of the aircraft 100, and at the other end to the frame 210, and is configured such that in stable horizontal flight the frame 210 can hang in a generally horizontal plane.

The frame 210 comprises an outer loop member 212, which has the form of an annular ring in the present embodiment. It is, more specifically, the outer loop member 212 by which the mount 202 is attached to the frame 210.

The frame 210 further comprises an inner loop member 214, which also has the form of an annular ring, but is of diminished dimensions relative to the outer loop member 212 and is located concentrically therewith.

Connecting struts 216 attach the outer loop member 212 and the inner loop member 214 to one another.

Each of a first set of lines 208 is attached at one end to the outer ring 212, and hangs free at its other end. These outer lines 208 are spaced at regular intervals.

Each of a second set of lines 206 is attached at one end to the inner ring 214, and hangs free at its other end. These inner lines 206 are spaced at regular intervals.

The first set of lines 208 are thinner than the second set of lines 206. The first set of lines 208 have a diameter of between 0.1 mm to 2 mm, and more preferably between 0.4 mm and 0.7 mm. Accordingly the first, outer set of lines 208 are particularly suitable for tangling with propellers or rotors.

The second set of lines 206 have a diameter of between 3 mm and 8 mm, and more preferably between 4 mm and 6 mm. Accordingly, the second, inner set of lines 206 have the volumetric capacity to offer enhanced drone inhibiting provisions.

Both line types of line are of generally the same length.

Figure 2A:
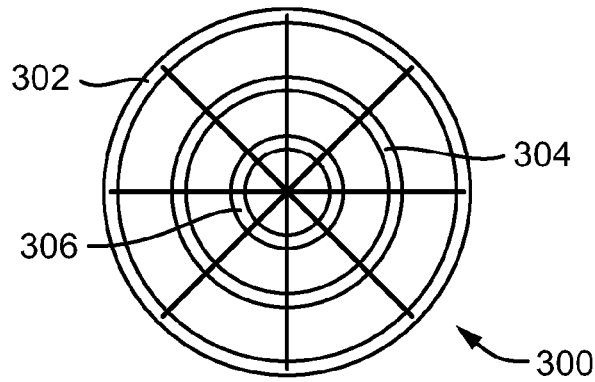
FIG. 2a shows a plan view of a variant frame for use with aircraft.

Further embodiments of frames are shown in FIGS. 2a, b, and c.

FIG. 2a shows a frame having loop-style members, and here there are three concentric annular members 306, 304, and 302 (going from inside outwards). First type lines 208 may be hung from the outermost member 302, and second type lines 206 may be hung from the innermost members 304, 306.

Figure 2B:
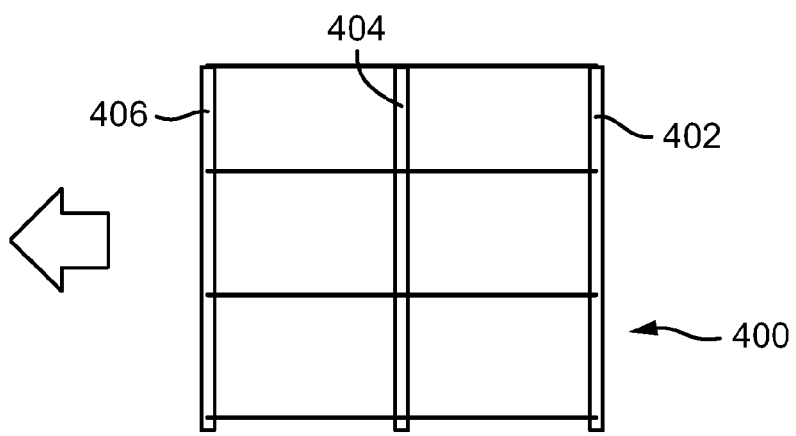
FIG. 2b shows a plan view of an alternative frame for use with the aircraft.

FIG. 2b shows a frame 400 having linear members where the outer member comprises first and second separate members 406 and 402 which sit either side of an inner member 404. All three members are substantially parallel, of the same length, are coplanar, and are spaced apart at regular intervals. First type lines 208 may be hung from the outermost members 406, 402, and second type lines 206 may be hung from the innermost member 404.

Figure 2C:
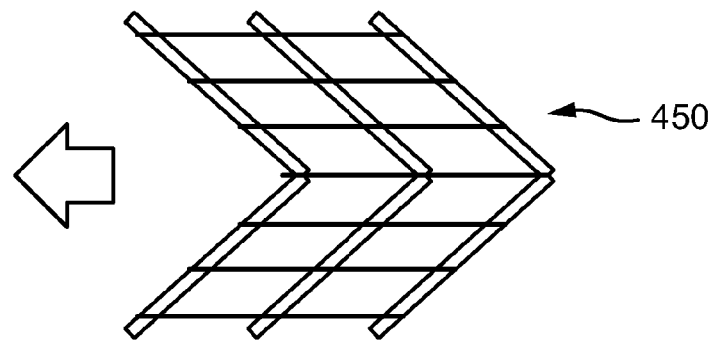
FIG. 2c shows a plan view of a further alternative frame for use with the aircraft.

FIG. 2c shows a frame 450 having linear members each of which is angled at its midpoint create a chevron form. Lines are arranged in a manner corresponding to the FIG. 2b embodiment and as such the frame 450 comprises a pair of outer members which are either side of a central member. The members are parallel and spaced at regular intervals.

In operation, an aircraft device 10 may be used to intercept a target rotorcraft by flying the aircraft device 10 over the target rotorcraft, such that the lines may interfere with the target rotorcraft.

A particular interference mechanism would involve the lines becoming wound around the rotors of the target rotorcraft. This would tend to inhibit the rotation of the rotors, and in turn the ability of the target rotorcraft to remain airborne. Moreover, this would tend to tether the aircraft device 10 to the target rotorcraft so as to enable the inhibited target rotorcraft to be dragged to a more favourable location for further neutralisation.

Figure 3:
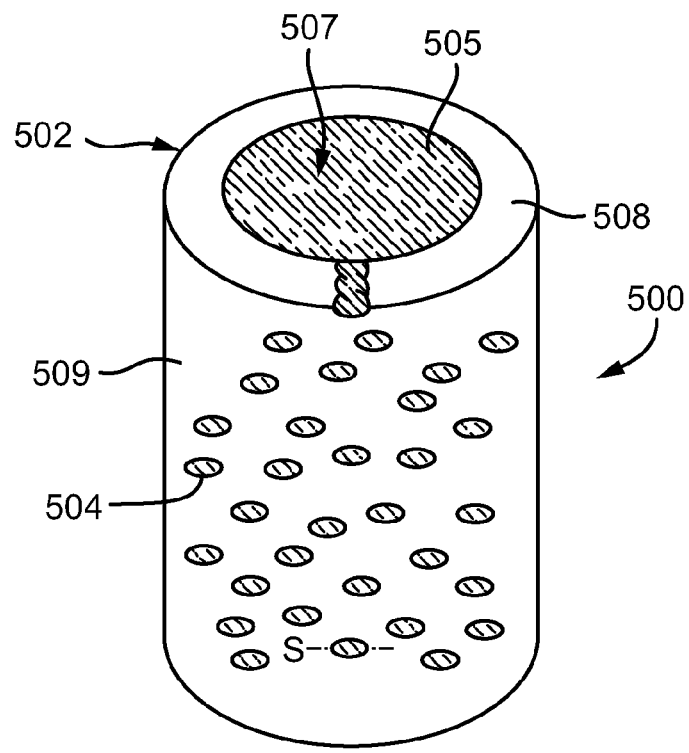
FIG. 3 shows a three-dimensional representation of a tubular member for use with the aircraft.

As a variant to the lines described above, an adhesive-expelling line 500 shown in FIG. 3 may be used as either or both of the first and second type of lines.

The line 500 comprises a flexible tubular member 502. The tubular member 502 provides a wall 508 and a bore 507. The wall 508 contains an adhesive fluid 505 within the bore 507.

Further, the wall 508 is provided with a plurality of slits 504. The plurality of slits 504 are arranged over the surface of the member 502 and extend through the thickness of the wall 508.

Figure 4A:
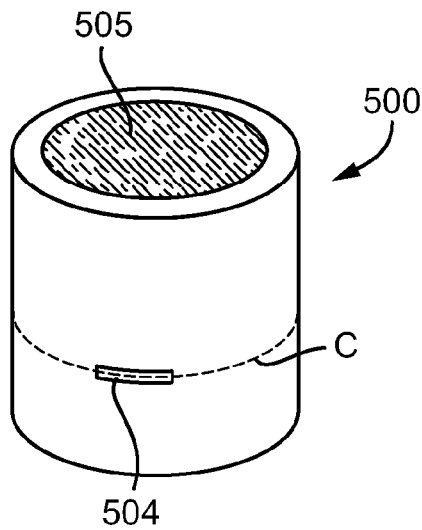
FIG. 4a shows a detail of the FIG. 3 member in a first condition.

Each slit 504 is generally biased to remain closed as shown in FIG. 4a, particularly when the member 500 is in an equilibrium position (without any bending stress).

However, each slit is further configured, in certain circumstances, to facilitate the expression of the adhesive fluid 505. More particularly each slit is configured to, in certain circumstance, open up to provide a channel between the bore 507 and the outer surface 509 of the member 502.

Figure 4B:
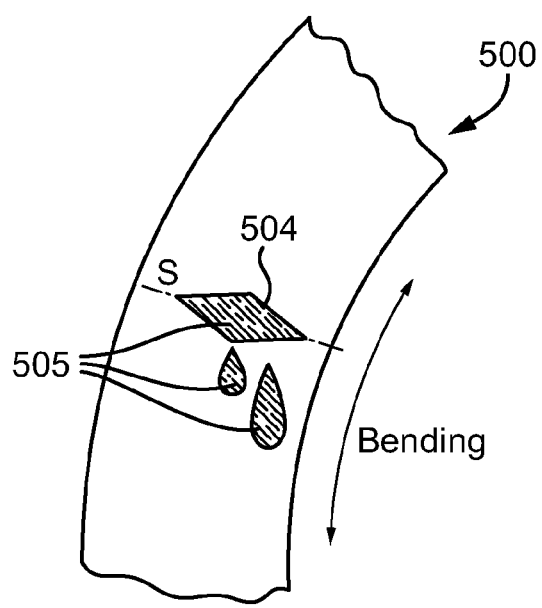
FIG. 4b shows a detail of the FIG. 3 member in a second condition.

To this end, as shown in FIG. 4b, each slit 504 is in the form of an elongate cut defining an axis S. Each axis S is arranged to be aligned with the circumference C of the member 502 such that axial bending which leads to tension along one side of the member 502 will tend to open up slits at the in-tension side, and allow adhesive to flow from the bore to the surface of the member 502.

Accordingly, when the adhesive-expressing line 500 is used in conjunction with the aircraft device 10 it offers a further mechanism whereby the line may interfere with a target rotorcraft and thereby tend to inhibit and control the motion of the target rotorcraft. Particularly the line 500 may, as it comes into contact with the target rotorcraft and wraps around it, tend to express adhesive 505 onto the surface 509 of the line 500.

This expressed adhesive 505 may inhibit the target rotorcraft by either: transferring from the line 500 to the target rotorcraft and clogging up its mechanisms; or by helping to bond the line 500 to the target rotorcraft whereupon the aircraft 100 becomes physically connected to the target rotorcraft and can drag the target rotorcraft to another, more desirable (e.g. safer) location.

Whereas above, the adhesive-expressing line 500 is disclosed as an alternative to the first 208 and second 206 type lines of the FIG. 1 embodiment, further contexts are contemplated for the adhesive-expressing line 500.

For example, the adhesive-expressing line 500 could be provided without any supporting aircraft.

As such the adhesive-expressing line 500 could be provided as a stand alone product for an operator to launch towards a target. Such a launch could be manual.

Alternatively, launch of the adhesive-expressing line 500 could be undertaken from a land (or sea) based launch device. Such launch devices may be guns or cannons and may fire out the adhesive-expressing line 500 directly, or may fire out an intermediate launch container (shell) from which the adhesive-expressing line 500 can be released shortly after firing.

Whilst in the above example the lines are described as inhibiting a target rotorcraft, it is contemplated that the apparatuses and methods would be applicable to other target or hostile aircraft.

For example the lines discussed could be suitable for tangling with a propeller aircraft.

For example the adhesive-expressing line 500 operates in such a way that it may bond to any surface which tends to deform the line 500. Accordingly it may bond to target aircraft which lack rotors or propellers (e.g. jet engine driven aircraft).

In general, the airborne targets contemplated here are lightweight (e.g. under 25 kg) and unmanned. Such may be colloquially referred to as 'drones'.

What is claimed is:

1. A line apparatus for inhibiting an airborne target comprising:
   at least one line comprising:
      a flexible tubular member, having a wall and defining a bore; and
      a fluid adhesive housed within the flexible tubular member,
   wherein the flexible tubular member is configured to express the fluid adhesive through the wall.

2. A line apparatus according to claim 1 wherein the flexible tubular member comprises:
   a plurality of slits through the wall, which slits are configured to remain generally closed, but on deformation of the flexible tubular member can open to permit the expression of the adhesive.

3. The line apparatus according to claim 2 wherein the slits follow a portion of a circumference of the tubular member.

4. The line apparatus according to claim 2 wherein the wall of the tubular member is in the form of a porous matrix such that the fluid adhesive may be urged to an outer diameter of the tubular member.

5. The line apparatus according to claim 1, wherein the at least one line is a plurality of lines.

6. The line apparatus according to claim 1, further comprising an aircraft, from which is suspended the at least one line.

7. The line apparatus according to claim 6 wherein the aircraft comprises a frame, from which is suspended the at least one line.

8. The line apparatus according to claim 6, further comprising at least one further type of line, being of a different type to the at least one line.

9. The line apparatus according to claim 8 wherein the at least one further type of line is thinner than the at least one line.

10. The line apparatus according to claim 9 wherein the at least one further type of line is a plurality of the further type of line.

11. The line apparatus according to claim 9, wherein the frame comprises:
    an inner member; and
    an outer member,
    wherein the at least one line is attached to the inner member, and the at least one further type of line is attached to the outer member.

12. The aircraft according to claim 7, wherein the aircraft is a rotorcraft.

13. The aircraft according to claim 7, wherein the aircraft has a mass of 25 kg or less.

14. The aircraft according to claim 7, wherein the aircraft is remotely or autonomously piloted.

15. A method of intercepting a target comprising:
    providing at least one line comprising:
       a flexible tubular member, having a wall and defining a bore; and
       a fluid adhesive housed within the flexible tubular member,
    wherein the flexible tubular member is configured to express the fluid adhesive through the wall, and
    applying the at least one line to the target, such that the line may bond to the target.

* * * * *